United States Patent
Mouroulis et al.

(10) Patent No.: US 12,189,484 B2
(45) Date of Patent: Jan. 7, 2025

(54) ERROR HANDLING OF RESPONSES

(71) Applicant: NOKIA TECHNOLOGIES OY, Espoo (FI)

(72) Inventors: Ioannis Mouroulis, Athens (GR); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 49 days.

(21) Appl. No.: 18/246,258

(22) PCT Filed: Sep. 22, 2020

(86) PCT No.: PCT/FI2020/050614
§ 371 (c)(1),
(2) Date: Mar. 22, 2023

(87) PCT Pub. No.: WO2022/064096
PCT Pub. Date: Mar. 31, 2022

(65) Prior Publication Data
US 2023/0359528 A1 Nov. 9, 2023

(51) Int. Cl.
*G06F 11/14* (2006.01)
*G06F 11/07* (2006.01)

(52) U.S. Cl.
CPC ...... *G06F 11/1443* (2013.01); *G06F 11/0751* (2013.01)

(58) Field of Classification Search
None
See application file for complete search history.

(56) References Cited

U.S. PATENT DOCUMENTS

2020/0267201 A1  8/2020  Rauschenbach et al.

FOREIGN PATENT DOCUMENTS

| WO | 2019/027480 A1 | 2/2019 |
| WO | 2020/069825 A1 | 4/2020 |
| WO | 2020/094914 A1 | 5/2020 |

OTHER PUBLICATIONS

"3rd Generation Partnership Project; Technical Specification Group Core Network and Terminals; 5G System; Principles and Guidelines for Services Definition; Stage 3 (Release 16)", 3GPP TS 29.501, V16.4.0, Jun. 2020, pp. 1-73.

Belshe et al., "Hypertext Transfer Protocol Version 2 (HTTP/2)", Internet Engineering Task Force (IETF), RFC 7540, May 2015, pp. 1-96.

(Continued)

*Primary Examiner* — Guerrier Merant
(74) *Attorney, Agent, or Firm* — Robert P. Michal, Esq.; Carter, DeLuca & Farrell LLP

(57) ABSTRACT

It is provided a method comprising: monitoring if a communication initiator receives a confirmation in response to an initial message from the communication initiator to a communication partner; supervising if the communication initiator successfully processes the confirmation; providing a non-successful information at a callback resource if the confirmation comprises the identifier of the callback resource and the communication initiator does not successfully process the confirmation; wherein the confirmation comprises an identifier of the callback resource; and the confirmation confirms that the initial message is successfully processed by the communication partner.

1 Claim, 15 Drawing Sheets

(56) References Cited

OTHER PUBLICATIONS

"3rd Generation Partnership Project; Technical Specification Group Services and System Aspects; System architecture for the 5G System (5GS); Stage 2 (Release 16)", 3GPP TS 23.501, V16.5.1, Aug. 2020, pp. 1-440.

"List of HTTP status codes", Wikipedia, Retrieved on May 24, 2024, Webpage available at : https://en.wikipedia.org/wiki/List_of_HTTP_status_codes.

"3rd Generation Partnership Project; Technical Specification Group Core Network and Terminals; 5G System; Session Management Services; Stage 3 (Release 16)", 3GPP TS 29.502, V16.4.0, Jul. 2020, pp. 1-256.

"3rd Generation Partnership Project; Technical Specification Group Core Network and Terminals; 5G System; Session Management Policy Control Service; Stage 3 (Release 16)", 3GPP TS 29.512, V16.5.0, Jun. 2020, pp. 1-197.

International Search Report and Written Opinion received for corresponding Patent Cooperation Treaty Application No. PCT/FI2020/050614, dated Mar. 26, 2021, 19 pages.

"3rd Generation Partnership Project; Technical Specification Group Core Network and Terminals; 5G System; Technical Realization of Service Based Architecture; Stage 3 (Release 16)", 3GPP TS 29.500, V16.4.0, Jun. 2020, pp. 1-79.

"3rd Generation Partnership Project; Technical Specification Group Core Network and Terminals; 5G System; Unified Data Management Services; Stage 3 (Release 16)", 3GPP TS 29.503, V16.4.0, Jul. 2020, pp. 1-347.

"Multi-access Edge Computing (MEC); General principles, patterns and common aspects of MEC Service APIs", Draft ETSI GS MEC 009, V2.1.5, Jul. 2020, pp. 1-70.

Extended European Search Report received for corresponding European Patent Application No. 20955113.4, dated May 10, 2024, 11 pages.

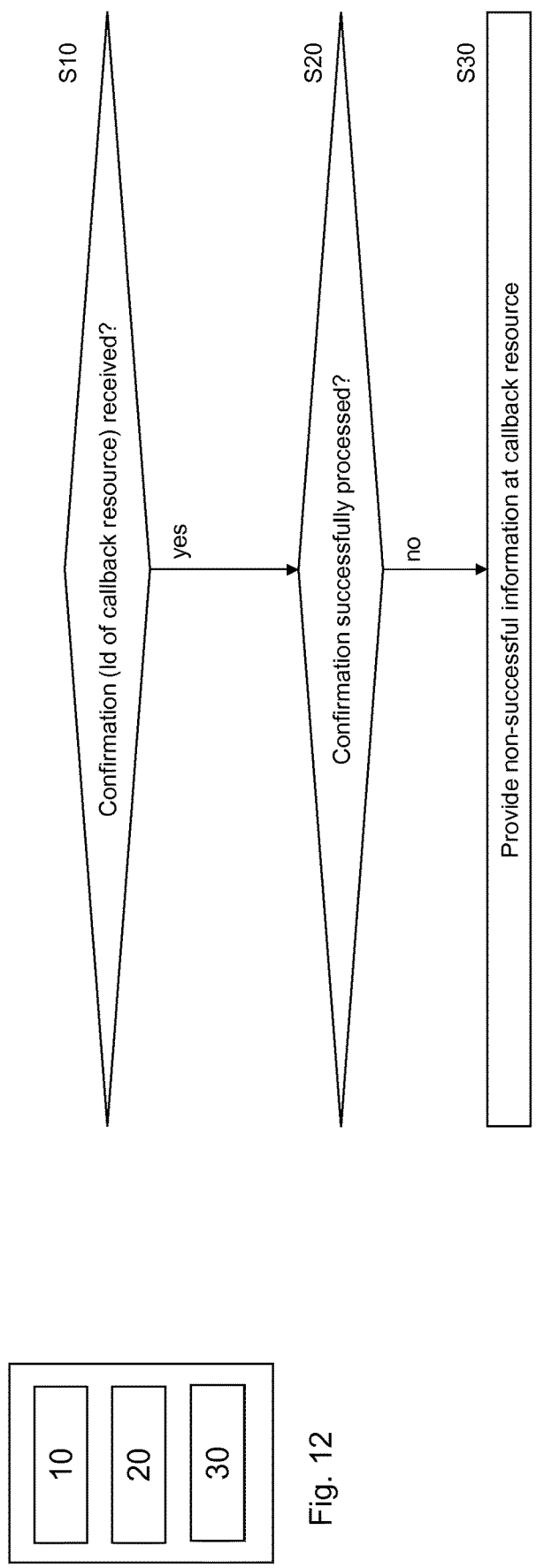

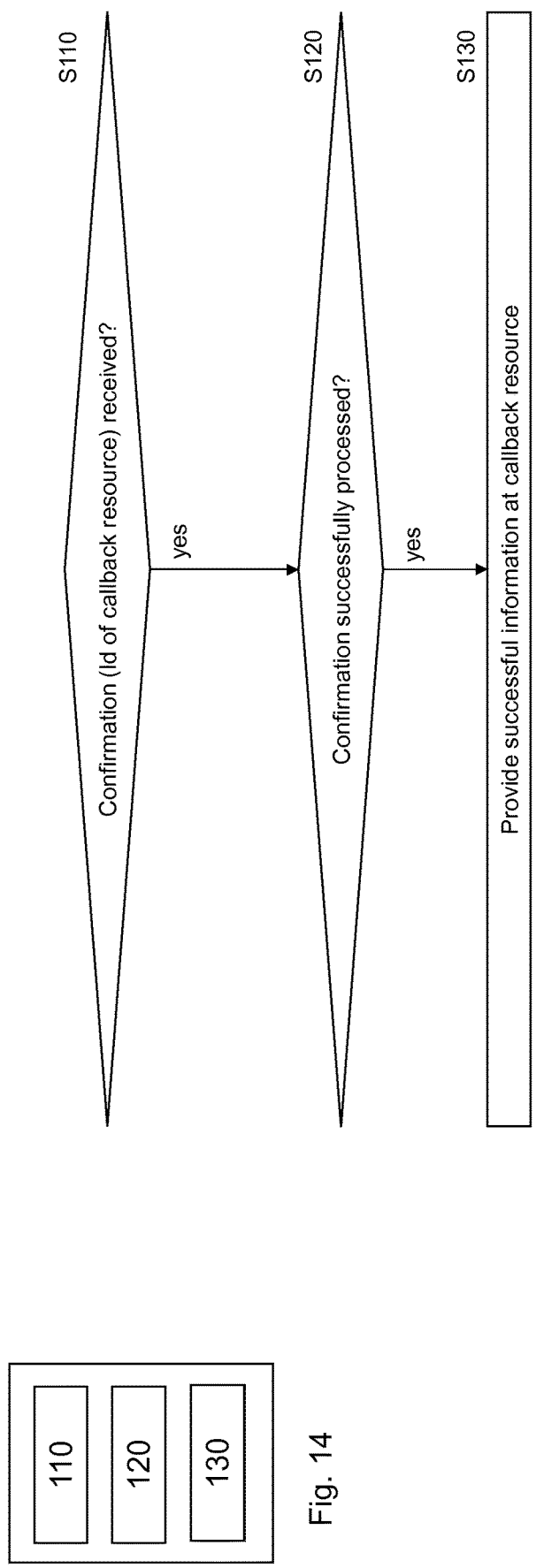

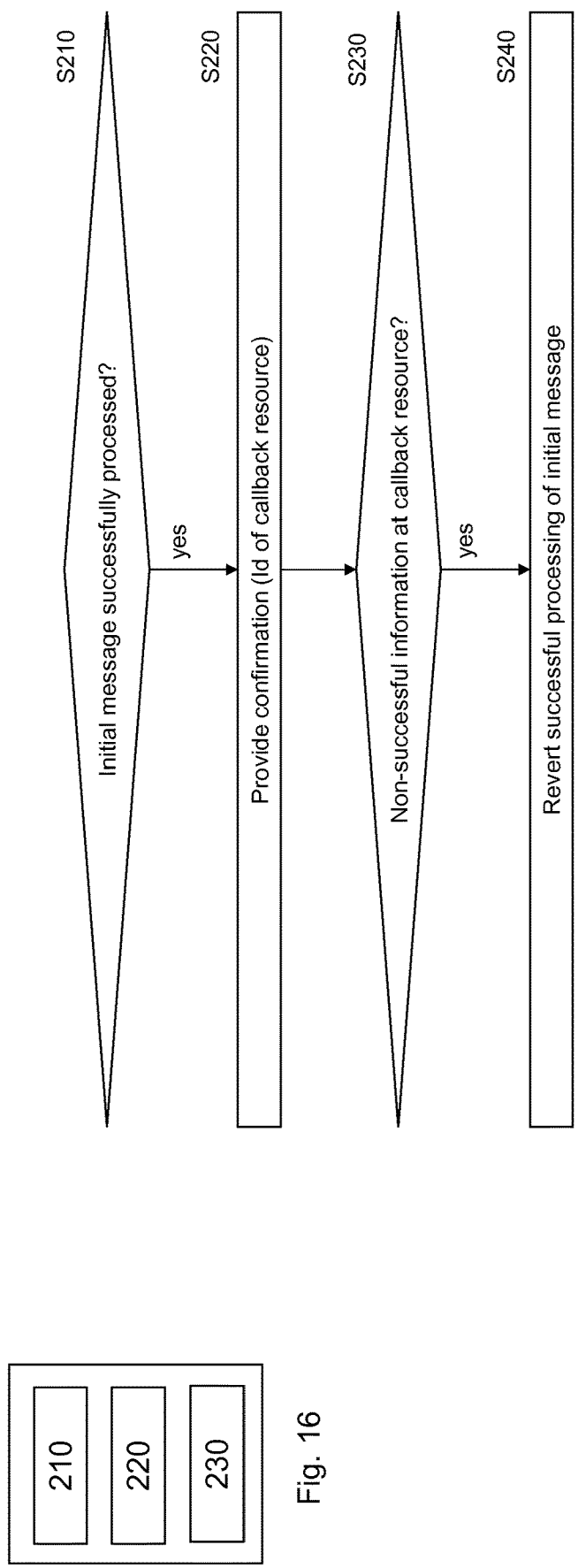

ERROR HANDLING OF RESPONSES

CROSS-REFERENCE TO RELATED APPLICATIONS

This application is a national phase entry of International Application No. PCT/FI2020/050614, filed Sep. 22, 2020, the contents of which are hereby incorporated by reference in their entirety.

FIELD OF THE INVENTION

The present disclosure relates to error handling. In particular, it relates to error handling in a request—response based communication, such as between client and server according to the HTTP.

Abbreviations

3GPP $3^{rd}$ Generation Partnership Project
3G/4G/5G $3^{rd}/4^{th}/5^{th}$ Generation
5GC 5G Core
5GS 5G System
ACK Acknowledgment (Positive)
API Application Programming Interface
HTTP Hypertext Transfer Protocol
HTTPS Hypertext Transfer Protocol-Secure
ID Identity
IE Information Element
IETF Internet Engineering Task Force
JSON JavaScript Object Notation
KPI Key Performance Indicator
NACK Negative Acknowledgment
NAS Non-access stratum
NF Network Function
PDU Protocol Data Unit
RAN Radio Access Network
RFC Request for Comments
RTC Realtime Communication
SBI Service-Based Interface
SCP Service Communication Proxy
SIP Session Initiation Protocol
SM Service Management
TCP Transmission Control Protocol
TS Technical Specification
URI Uniform Resource Identifier

BACKGROUND OF THE INVENTION

HTTP works in the client-server model. The client initiates a communication session with the server, which awaits incoming requests. The server provides a service to the client in response to the request. In HTTP a Server can clearly Respond to Client whether it was able to process a Request or not by using the appropriate Status codes, and adding problem details in a JSON Body etc. (as defined in RFC 7540 and further specified in 3GPP TS 29.500).

NACK/ACK mechanisms are part of the specification of certain protocols e.g. IETF SIP, TCP, WebRTC and 3GPP NAS. However, HTTP protocol specification supports neither ACK nor NACK messages and cannot be extended to do so, without IETF standardization.

In HTTP, a 2xx response means a response having a number between 200 and 299. It means that the request was successful. In particular, a 200 OK response means that the request was successfully executed, and a 201 Created response means that the request was successfully executed and that a resource was created in the HTTP server. A 202 response indicates that the request has been accepted for processing, but the processing has not been completed. A 204 response means No Content: The server successfully processed the request, and is not returning any content. For further details on HTTP 2xx responses, see e.g. "2xx success" at https://en.wikipedia.org/wiki/List_of_HTTP_status_codes.

5GC Service Based architecture APIs are based on the HTTP protocol. According to 3GPP TS 23.501, an NF service is one type of capability exposed by an NF (NF Service Producer) to other authorized NF (NF Service Consumer) through a service-based interface. A Network Function may expose one or more NF services. NF services may communicate directly between NF Service consumers and NF Service Producers, or indirectly via an SCP.

The end-to-end interaction between two Network Functions (Consumer and Producer) within this NF service framework follows two mechanisms, irrespective of whether Direct Communication or Indirect Communication is used:

"Request-response": A Control Plane NF_B (NF Service Producer) is requested by another Control Plane NF_A (NF Service Consumer) to provide a certain NF service, which either performs an action or provides information or both. NF_B provides an NF service based on the request by NF_A. In Request-response mechanism, communication is one to one between two NFs (consumer and producer) and a one-time response from the producer to a request from the consumer is expected within a certain timeframe.

"Subscribe-Notify": A Control Plane NF_A (NF Service Consumer) subscribes to NF Service offered by another Control Plane NF_B (NF Service Producer). The NF Service Producer NF B notifies the NF Service Consumer NF A if a certain condition is fulfilled.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: monitor if a communication initiator receives a confirmation in response to an initial message from the communication initiator to a communication partner; supervise if the communication initiator successfully processes the confirmation; provide a non-successful information at a callback resource if the confirmation comprises the identifier of the callback resource and the communication initiator does not successfully process the confirmation; wherein the confirmation comprises an identifier of the callback resource; and the confirmation confirms that the initial message is successfully processed by the communication partner.

According to a second aspect of the invention, there is provided an apparatus comprising: one or more processors, and memory storing instructions that, when executed by the one or more processors, cause the apparatus to: monitor if a communication initiator receives a confirmation in response to an initial message from the communication initiator to a communication partner; supervise if the communication initiator successfully processes the confirmation; provide a successful information at a callback resource if the confirmation comprises the identifier of the callback resource and the communication initiator successfully processes the confirmation; wherein the confirmation comprises an identifier of the callback resource; and the confirmation confirms that the initial message is successfully processed by the communication partner.

According to a third aspect of the invention, there is provided an apparatus comprising: one or more processors, and memory storing instructions that, when executed by the one or more processors, cause the apparatus to: supervise whether a communication partner processes successfully an initial message, wherein the communication partner receives the initial message from a communication initiator; instruct the communication partner to provide a confirmation in response to the initial message if the communication partner successfully processes the initial message, wherein the confirmation comprises an identifier of a callback resource; monitor whether a non-successful information is provided at the callback resource after the providing of the confirmation, wherein the unsuccessful information informs that the communication initiator does not process successfully the confirmation; order the communication partner to revert the successful processing of the initial message if the non-successful information is provided at the callback resource after the providing of the confirmation.

According to a fourth aspect of the invention, there is provided an apparatus comprising: one or more processors, and memory storing instructions that, when executed by the one or more processors, cause the apparatus to: supervise if a communication partner successfully processes an initial message, wherein the communication partner receives the initial message from a communication initiator; instruct the communication partner to provide a confirmation in response to the initial message if the communication partner successfully processes the initial message, wherein the confirmation comprises an identifier of a callback resource; monitor whether a successful information is provided at the callback resource within a predefined waiting time after the providing of the confirmation, wherein the successful information informs that the communication initiator processes successfully the confirmation; order the communication partner to revert the successful processing of the initial message if the successful information is not provided at the callback resource within the predefined waiting time after the providing of the confirmation.

According to a fifth aspect of the invention, there is provided a method comprising: monitoring if a communication initiator receives a confirmation in response to an initial message from the communication initiator to a communication partner; supervising if the communication initiator successfully processes the confirmation; providing a non-successful information at a callback resource if the confirmation comprises the identifier of the callback resource and the communication initiator does not successfully process the confirmation; wherein the confirmation comprises an identifier of the callback resource; and the confirmation confirms that the initial message is successfully processed by the communication partner.

According to a sixth aspect of the invention, there is provided a method comprising: monitoring if a communication initiator receives a confirmation in response to an initial message from the communication initiator to a communication partner; supervising if the communication initiator successfully processes the confirmation; providing a successful information at a callback resource if the confirmation comprises the identifier of the callback resource and the communication initiator successfully processes the confirmation; wherein the confirmation comprises an identifier of the callback resource; and the confirmation confirms that the initial message is successfully processed by the communication partner.

According to a seventh aspect of the invention, there is provided a method comprising: supervising whether a communication partner processes successfully an initial message, wherein the communication partner receives the initial message from a communication initiator; instructing the communication partner to provide a confirmation in response to the initial message if the communication partner successfully processes the initial message, wherein the confirmation comprises an identifier of a callback resource; monitoring whether a non-successful information is provided at the callback resource after the providing of the confirmation, wherein the unsuccessful information informs that the communication initiator does not process successfully the confirmation; ordering the communication partner to revert the successful processing of the initial message if the non-successful information is provided at the callback resource after the providing of the confirmation.

According to an eighth aspect of the invention, there is provided a method comprising: supervising if a communication partner successfully processes an initial message, wherein the communication partner receives the initial message from a communication initiator; instructing the communication partner to provide a confirmation in response to the initial message if the communication partner successfully processes the initial message, wherein the confirmation comprises an identifier of a callback resource; monitoring whether a successful information is provided at the callback resource within a predefined waiting time after the providing of the confirmation, wherein the successful information informs that the communication initiator processes successfully the confirmation; ordering the communication partner to revert the successful processing of the initial message if the successful information is not provided at the callback resource within the predefined waiting time after the providing of the confirmation.

Each of the methods of the fifth to eighth aspects may be a method of error handling.

According to a ninth aspect of the invention, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some embodiments of the invention, at least one of the following advantages may be achieved:
Improved network robustness:
Efficiency: Minimum signaling overhead
Backwards Compatibility
No need to modify the HTTP protocol;
Implementation Agility
Consistent KPI status.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 12 shows an apparatus according to an example embodiment of the invention;

FIG. 13 shows a method according to an example embodiment of the invention;

FIG. 14 shows an apparatus according to an example embodiment of the invention;

FIG. 15 shows a method according to an example embodiment of the invention;

FIG. 16 shows an apparatus according to an example embodiment of the invention;

FIG. 17 shows a method according to an example embodiment of the invention;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Conventionally, the HTTP Client has no way to indicate back to Server whether or not the response to a request was successfully processed. However, correct handling of responses by a client is generally important, especially for non-idempotent Requests that succeed on the Server side (e.g. Create SM Context operation of the Nsmf_PDUSession API in 3GPP TS 29.502, or PolicyControl_Create operation of the Npcf_SM API in 3GPP TS 29.512 etc). An idempotent request is an HTTP method that can be called many times without different outcomes (e.g. GET, PUT, DELETE, HEAD, OPTIONS and TRACE but not POST).

Failure to process a Response may lead to an inconsistent resource status with various consequences:
Depletion of server resources
Failures in subsequent Requests due to collisions
inconsistent state between Server and Client The 5GC SBI API HTTP 2xx Responses may have equally complex HTTP Headers and JSON bodies as the Requests do have, thus the responses are exposed to similar problems as those that can make a Request fail (e.g. Mandatory IE missing/incorrect, unsupported lengths etc.).

The NFs acting as HTTP Clients are often not able to send a subsequent Request that can revert the impact of the original Request either due to API restrictions (e.g. not allowed to send PATCH (which modifies an already created resource)), or due to missing information in regards of the actual Resource status because the Response was unsuccessfully processed).

Figure 1:
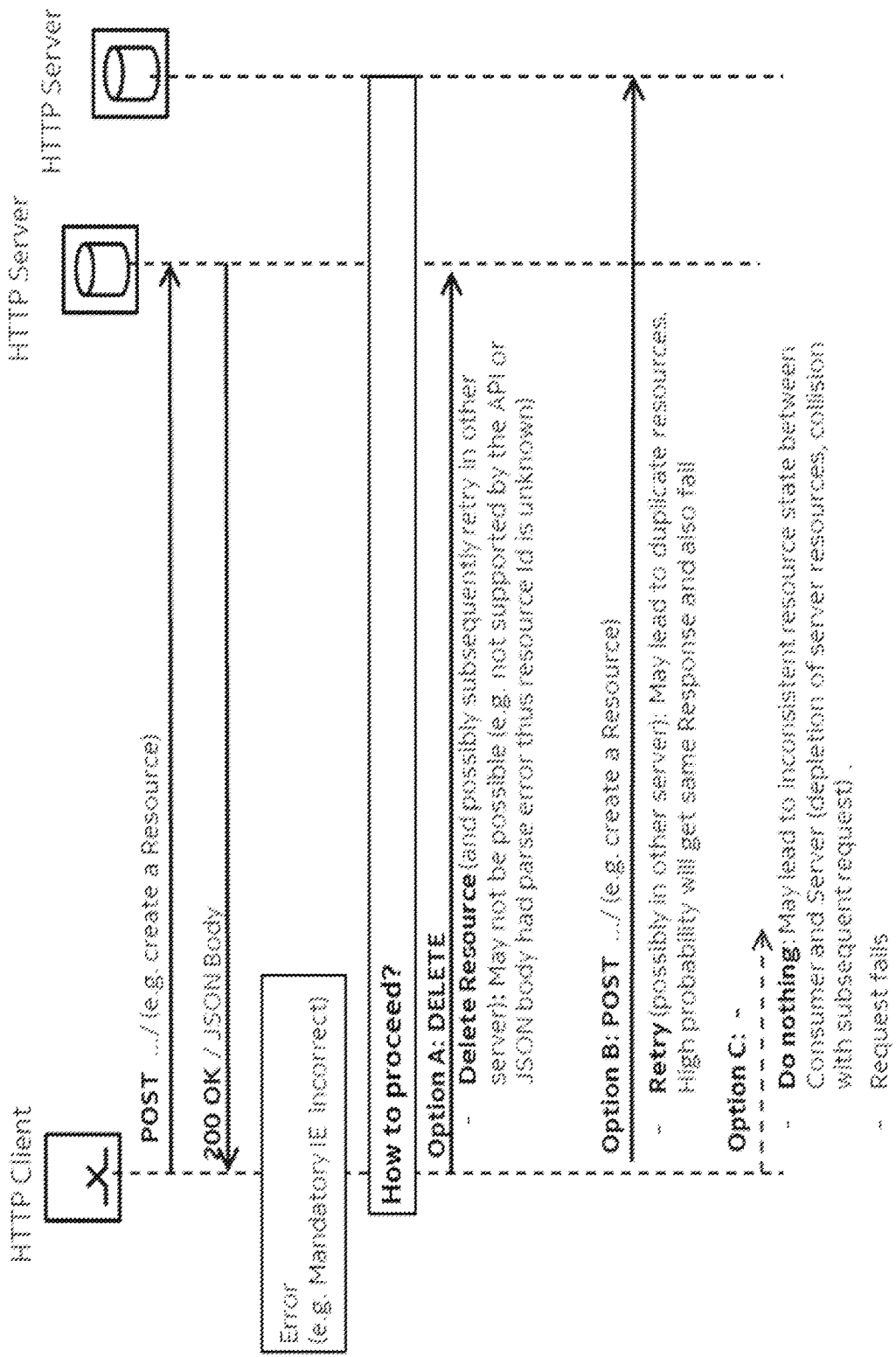
FIG. 1 illustrates a technical problem solved by some example embodiments of the invention.

FIG. 1 shows a scenario where an error occurs on a HTTP client when the HTTP client processes a 200 OK response. In detail, the client (communication initiator) sent a request (such as HTTP POST, e.g. for creating a resource) to a HTTP server (communication partner). The HTTP server executed the requested action successfully and replies with a 200 OK response, which may also comprise a JSON body to provide details. However, the HTTP client cannot process the 200 OK response, e.g. because a mandatory IE is missing or incorrect.

Conventionally, there are the following options, as shown in FIG. 1:

A. The HTTP client may request the HTTP server to delete the resource. However, this is not always possible. For example, the API between the HTTP client and the HTTP server may not allow a delete operation, or the HTTP client may not know the Id of the created resource because of a parse error.

B. The HTTP client may retry to create the resource. Potentially, it may retry such creation in another HTTP server than the previous HTP server. If successful, it might result in duplicated resources. Furthermore, the 200 OK response to the second request may be erroneous, too, such that the same problem occurs again.

C. The HTTP client may not do anything with respect to the error. This may result in inconsistent resource states between the HTTP client and the HTTP server, which, as a consequence, might result in depletion of server resources or a collision with subsequent requests such that a subsequent request might fail.

Further problematic scenarios may occur when the Indirect communication model is used in 5GC. In the Indirect communication model, the communication between the HTTP client and the HTTP server is relayed by a Service Communication Proxy (SCP) which selects the NF producer (HTTP server, provider).

Figure 2:
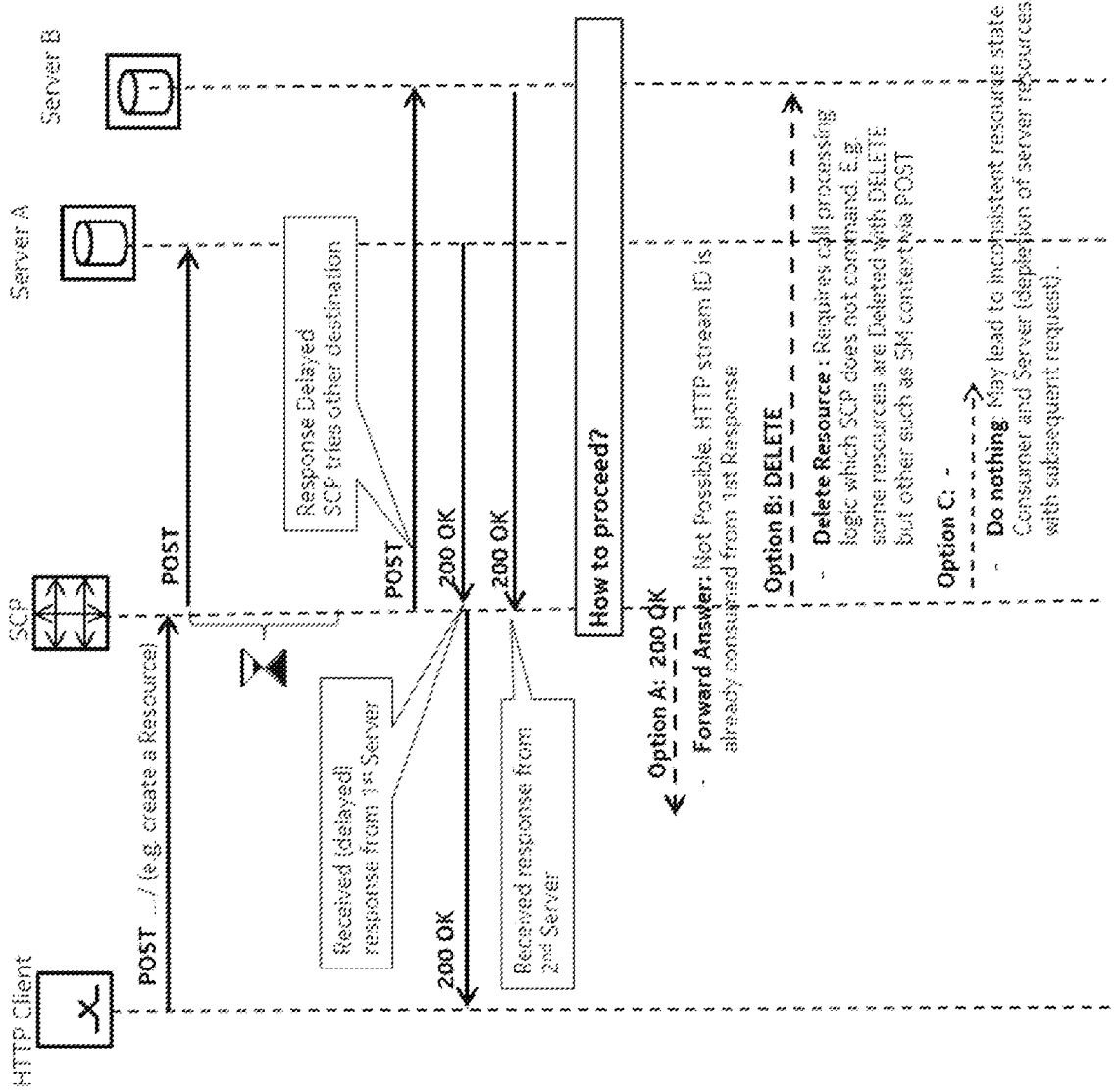
FIG. 2 illustrates a technical problem solved by some example embodiments of the invention.

When the NF Producer selection is delegated to the Service Communication Proxy (SCP) and the originally selected NF instance (producer) has not responded to the Request in a timely manner, the SCP may retry to send the Request to an alternative NF Service Producer instance (e.g. to another NF from the same NF set). However, as shown in FIG. 2, this "forking" of Requests may lead to a situation where the SCP eventually receives an HTTP Response from multiple servers if the originally selected producer provides a response after the subsequently selected producer was requested. As per HTTP protocol specifications, the SCP can only relay a single response back to the HTTP Client because the same Stream ID must not be used for two responses. Furthermore, typically, the SCP is not able to revert the impact of the original Request as this needs understanding of the call processing specifics (e.g. in some cases created resources are deleted via DELETE Request while in others, such as SM Contexts, are deleted via a POST request and have a JSON body). Thus, the only option the SCP has, is to drop one of the responses (e.g. the $2^{nd}$ response) which may lead to similar problems as in the case where 200 OK Response is not successfully processed by the HTTP client that originated the request (depletion of server resources and failures in subsequent Requests due to collisions or inconsistent states).

Figure 3:
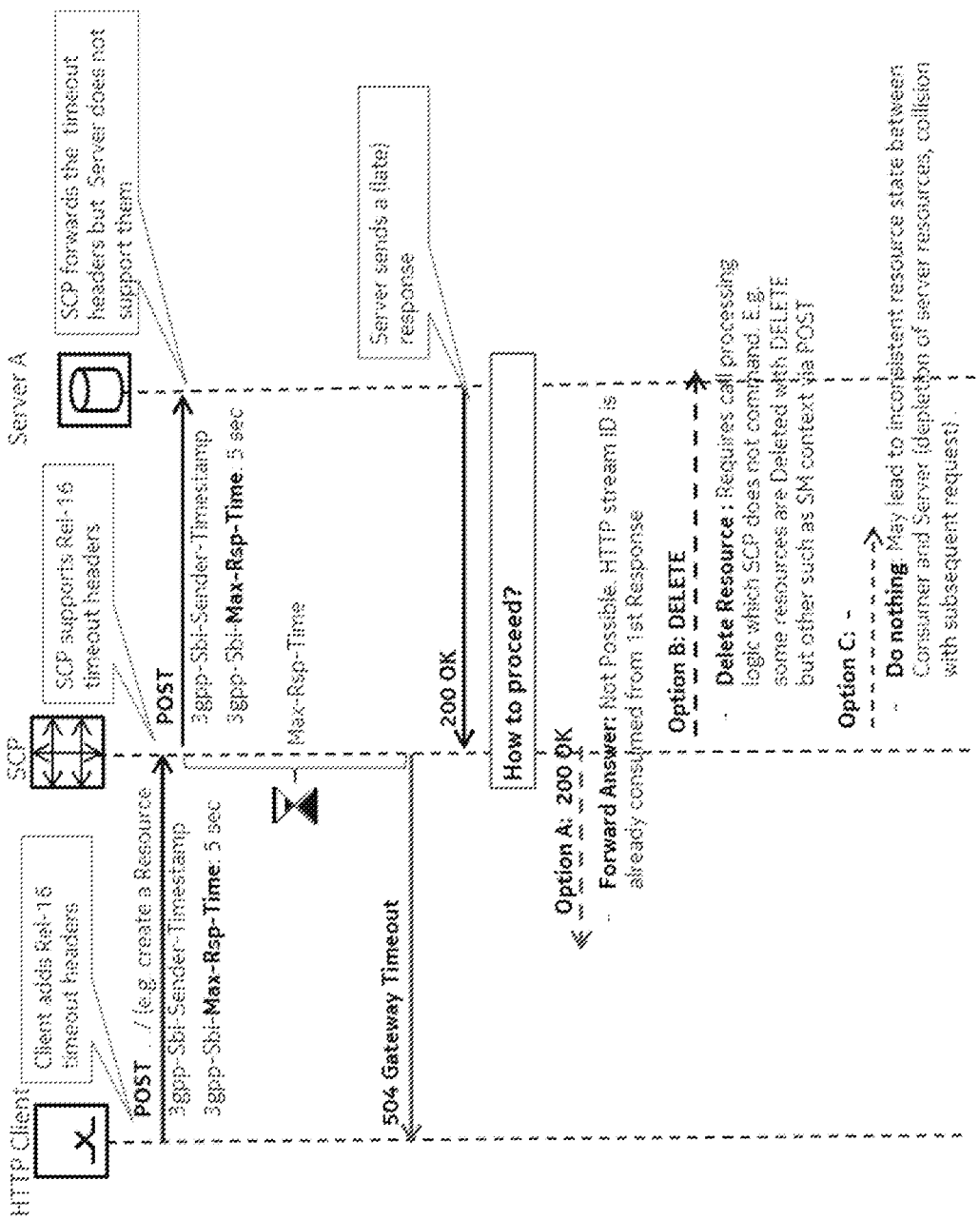
FIG. 3 illustrates a technical problem solved by some example embodiments of the invention.

Another problematic scenario related to indirect communication may occur when both the HTTP client and the SCP support the 3GPP Rel-16 mechanism to detect late arriving requests (see clause 6.11 of 3GPP TS 29.500), while this mechanism is not supported by the producer. As shown in FIG. 3, the HTTP client originating a request may include in the request the 3gpp-Sbi-Sender-Timestamp and the 3gpp-Sbi-Max-Rsp-Time headers indicating when the request should time out. In case the SCP has forwarded the request to a Server and has not received a response in time, the SCP may reject the Client's request with status code "504 Gateway Timeout". However, if the Server did not support the mechanism and ignores the 3gpp-Sbi-Sender-Timestamp and the 3gpp-Sbi-Max-Rsp-Time headers, the server may respond to the SCP with a 200 OK response after the maximum response time. The SCP must not relay this response to the client because it replied to the client with "504 Gateway Timeout". This may result in the same issues as discussed with respect to the previous two scenarios.

Similar scenarios can also occur in case SCP is not able to relay the response back to the client originating a request due to networking issues (e.g. SCP—Producer connection is OK but Client—SCP connection failed in the meantime).

Some example embodiments of the invention provide a solution to address the aforementioned problems. Basically, there are two alternative designs: One design is based on a mechanism that the communication initiator (client in FIG. 1) sends Negative Acknowledgement in case of failure to successfully handle the response ("NACK-like" Mechanism), while in the other design the communication initiator sends a message as a positive acknowledgement that a Response is successfully processed ("ACK-like mechanism").

According to some example embodiments of the invention, the HTTP protocol remains unmodified. In particular, the ACK/NACK-like mechanism is not embedded within the protocol. Instead, the "ACK/NACK-like" mechanism operates on application level on top of HTTP. Thus, for example, 5GC APIs (or other APIs, e.g. of 5G RAN) may use the mechanism without any changes in the underlying HTTP protocol.

The ACK/NACK mechanism according to some example embodiments:
 is a separate transaction from the initial Request/Response, and
 comprises two messages (Request+Response).

That is, the communication initiator (e.g. client) may receive an acknowledgment comprising status information indicating whether the ACK/NACK-like message was successfully processed by the communication partner (e.g. server) in the Response message to the ACK/NACK-like Request.

In contrast, in protocols where ACK/NACK is embedded in the protocol (e.g. IETF SIP, TCP, WebRTC and 3GPP NAS), the ACK/NACK mechanism:
 is considered as part of the single transaction that includes the initial Request/Response+ACK/NACK; and
 is a single message.

Thus, the client does not receive any confirmation whether the ACK/NACK was successfully processed by the Server.

According to some example embodiments of the invention, a network function (e.g. a 5GC network function) or an SCP acting as HTTP client (communication initiator) may indicate to a NF acting as the HTTP Server (communication partner) that a previously sent Response was not successfully processed by the Client. The server may use that indication to attempt to revert the impact of the previously processed Request (e.g. Creation of a PDU session). The "NACK-like" design explained further below may also provide an indication back to the Client whether the revert was successful or not.

Two alternative implementations of example embodiments of the invention are provided:
 a NACK-like mechanism, and
 an ACK-like mechanism.

Figure 4:
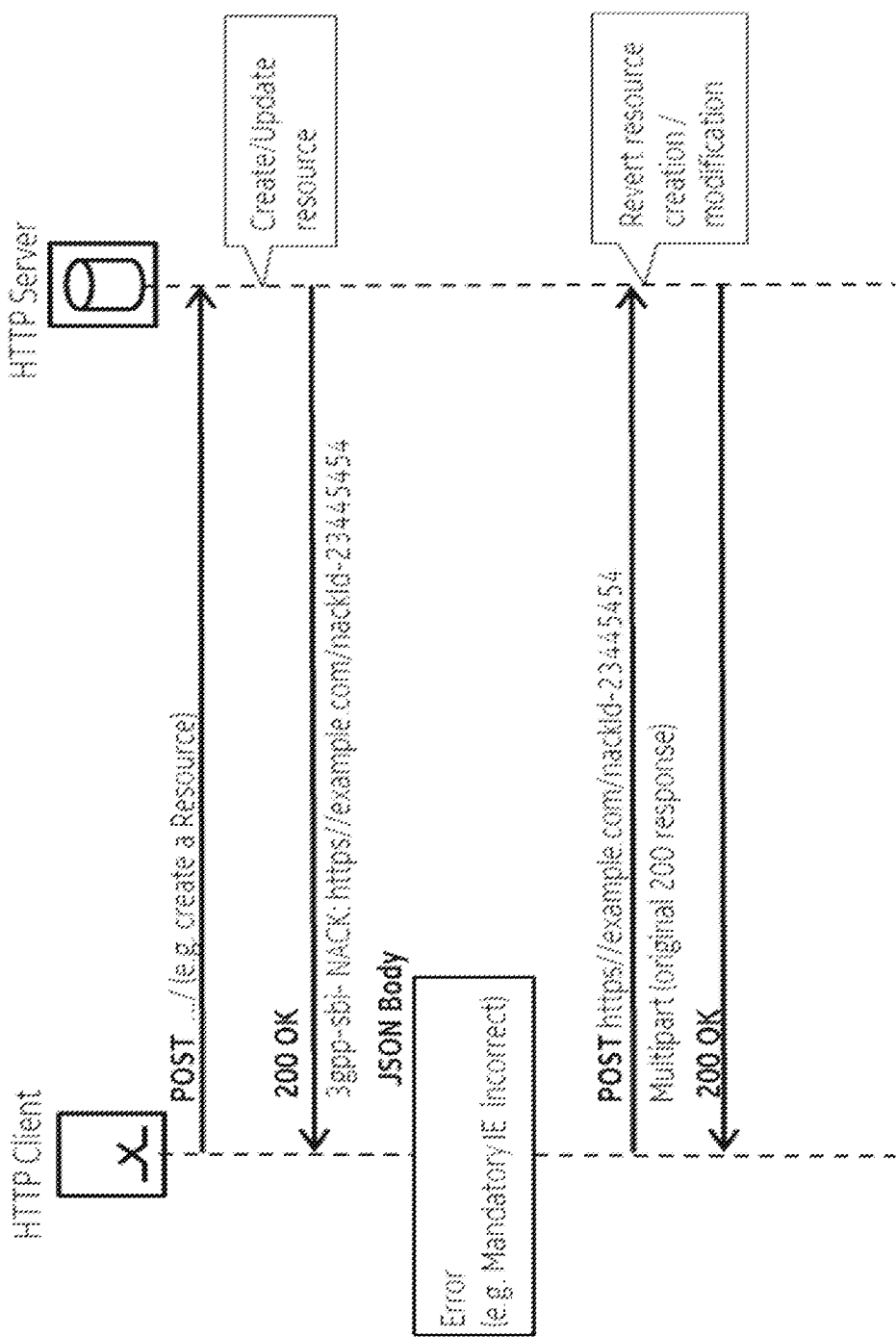
FIG. 4 shows a message flow according to some example embodiments of the invention.

NACK-Like Mechanism:

In this design alternative, as shown in FIG. 4, the HTTP client formulates the Request as per current API specifications. If the Request is successfully processed and the Server supports the NACK-like mechanism for this Request, it adds to the 2xx Response a new HTTP header that includes a Callback URI for sending the "NACK", if necessary. In this application, this 2x response including the callback URI may be called "confirmation".

If the Client successfully processes the response no other message is sent in the context of this transaction. However, if the HTTP Client fails to process the 2xx Response, it sends a subsequent POST (NACK-like) Request to the Callback URI received from the Server in the response. Upon reception of the NACK-like request, the Server attempts to revert the operation triggered by the original Request and informs the Client about the outcome of the reverting operation in the response to the POST (NACK-like) Request (also called "acknowledgment").

Figure 5:
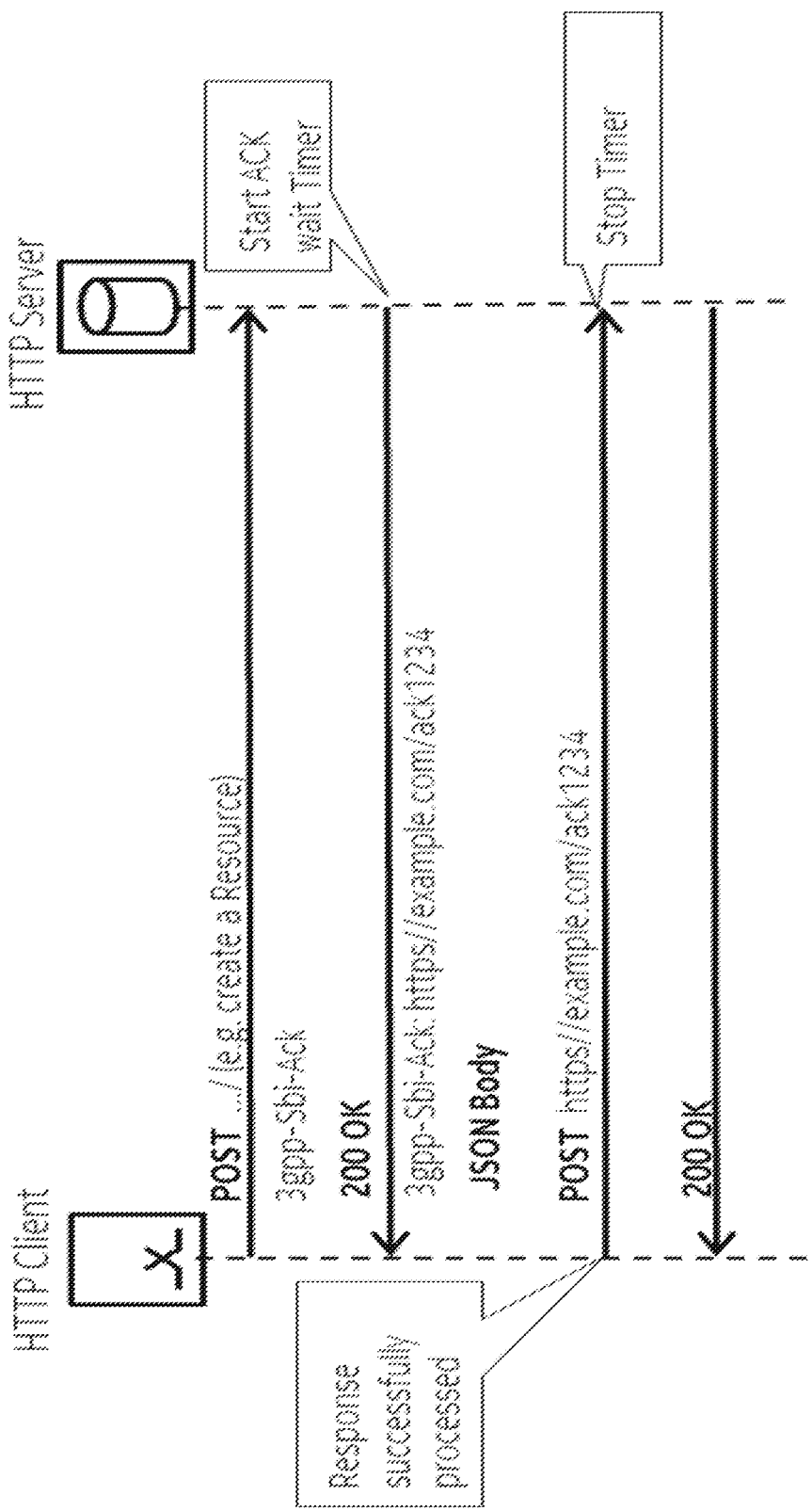
FIG. 5 shows a message flow according to some example embodiments of the invention.

ACK-Like Mechanism:

In this design alternative, as shown in FIG. 5, the HTTP client may indicate in the Request that it wants to use the ACK-like mechanism by adding a new HTTP header. If the Request is successfully processed and the Server supports the ACK-like mechanism for this Request, it adds in the Response a HTTP header that includes the Callback URI where the "ACK-like" shall be sent. Upon successful processing of the response, the Client sends a subsequent POST (ACK-like) to the Callback URI provided by the Server. If the server does not receive an ACK-like within a (predefined) waiting time, the server attempts to revert the operation triggered by the initial request.

The indication to use the ACK-like mechanism may be omitted if it is known that both the client and the server support the ACK-like mechanism. For example, the ACK-like mechanism may be generally defined in the respective communication standard (e.g. 3GPP), or the server and the requester may inform the other party thereabout when they are set up.

Hereinafter, these design alternatives are explained at greater detail:

"NACK-Like" Mechanism

In this design alternative:
 The 5GC Network Element that acts as communication initiator (e.g. an HTTP Client) sends the Request (initial message) as per current APIs specifications to the communication partner (e.g. HTTP server).

The HTTP Server prepares the Response as per currently defined APIs. However, if
- The server supports the NACK-like mechanism described in this invention (optional check), and
- The Request was successfully processed (Response has a 2xx status code), and
- It is potentially capable to revert the impact of the operation for the specific request (optional check), e.g. it is able to revert the creation of a resource by deleting the resource, it adds a Callback URI in the 2xx response in a (newly defined) HTTP Header (e.g. 3gpp-sbi-NACK).

In case the 2xx Response is successfully processed by the NF acting as the HTTP client or if the Client does not support the NACK-like mechanism no further transaction takes place.

In case the HTTP Client:
- failed to process 2xx Response successfully or if the Client is an SCP that cannot further relay the response (e.g. has previously relayed a different response from another server for the same request), and
- supports the NACK-like mechanism (optional check), and
- is configured to attempt to revert the impact of the operation for the relevant Request (optional check)

it informs accordingly the Server by sending a subsequent new HTTP POST (NACK-like) Request to the Callback URI the Server provided in the relevant header of the previous response. The Request may optionally encapsulate the Server's original 2xx response (e.g. using HTTP multipart message)

Upon reception of a kind of negative acknowledgement (NACK-like), the Server will attempt to revert to its original state (i.e. the state as if the original request (initial message) was never Processed).

If the revert is successful, the Server responds with 200 OK. This indicates to the client that the status reversal succeeded, and the client shall assume that original state is restored (equivalent as if it had received 4xx/5xx to the original request, which indicates some errors in the processing of the original request).

If the server did not succeed to revert the operation because, for example, the original resource is no longer available due to subsequent operations, the Server will respond with an appropriate error code (e.g. 404 Not Found) If either the Client or the Server does not support the "NACK-like" mechanism or the NACK was responded with a 4xx/5xx error the current handling mechanisms apply.

Figure 6:
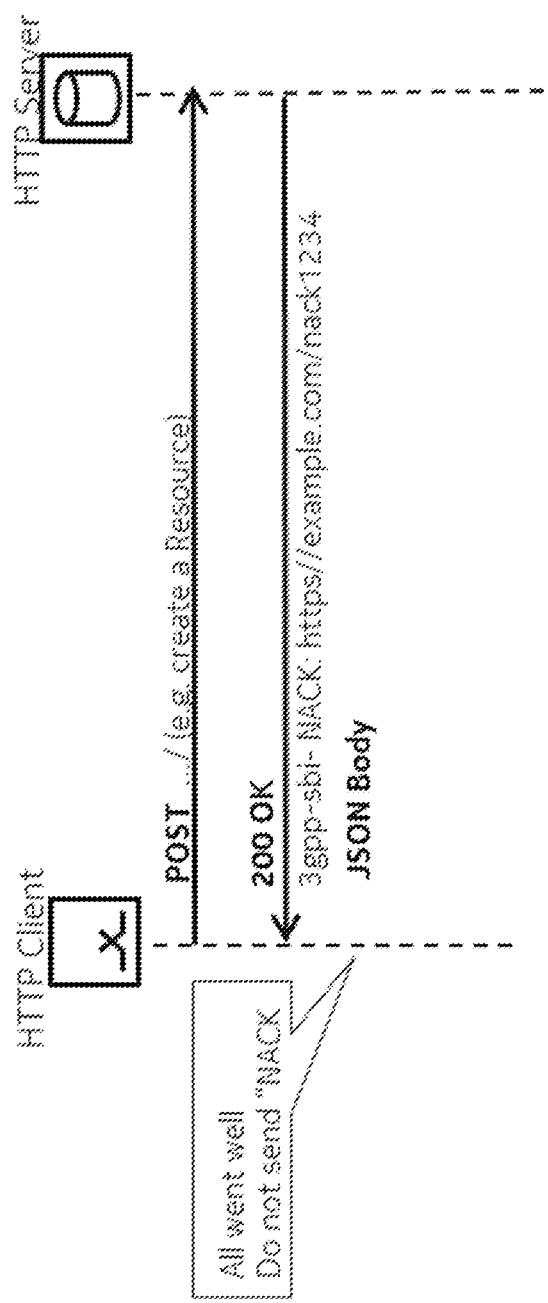
FIG. 6 shows a message flow according to some example embodiments of the invention.
Figure 7:
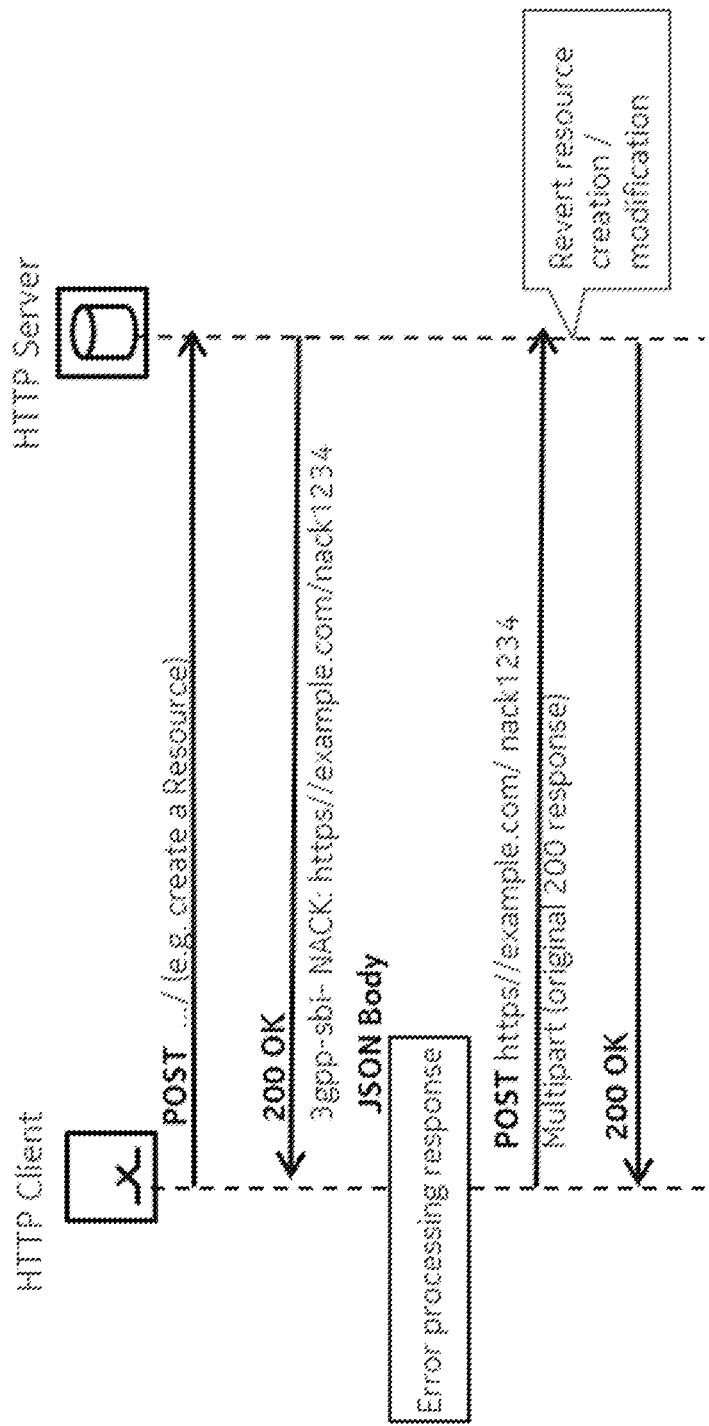
FIG. 7 shows a message flow according to some example embodiments of the invention.
Figure 8:
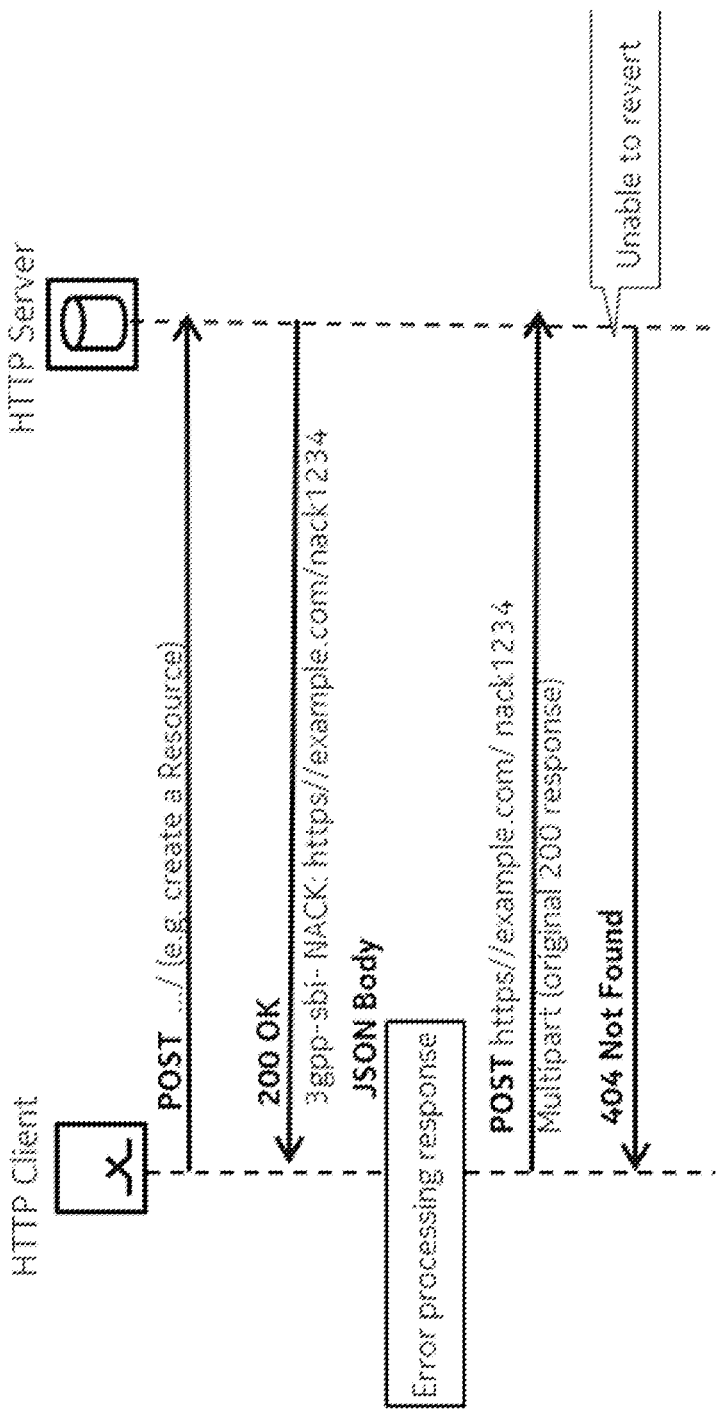
FIG. 8 shows a message flow according to some example embodiments of the invention.

Detailed message flows (in addition to that of FIG. 4) for the different cases according to some example embodiments of the invention with the NACK-like design are shown in FIGS. 6 to 8.

FIG. 6 shows a message flow, wherein the HTTP client (communication initiator) successfully processes the 200 OK response from the HTTP server (communication partner). In this case, no further message is exchanged after the 200 OK response. The message flow corresponds to a conventional message flow.

In FIG. 7, the HTTP client (communication initiator) does not successfully process the 200 OK response from the HTTP server (communication partner). Accordingly, the HTTP client sends (POST) on the location indicated by the HTTP server in the 200 OK response (NACK-like). The POST may also include the original 200 OK response message. When the HTTP server observes that the NACK-like was posted at the indicated resource, it reverts the successful processing of the initial message (e.g. reverts creating a resource by deleting the resource). If the reverting was successful, the HTP server sends 200 OK response to the POST message with the NACK-like.

FIG. 8 corresponds to FIG. 7. However, the HTTP server is not able to revert the processing of the initial message. In this case, the HTTP server sends 404 (not found) response to the POST message with the NACK-like. 404 is just one example error cause which may be used for a case of unsuccessful reverting. The invention is not limited to this error cause.

The message flows of FIGS. 4 and 6 to 8 are also applicable in case of an SCP. In this case, the SCP plays the role of the HTTP client. Processing error in the HTTP client may correspond to a processing error in the SCP, or it may correspond to the SCP being unable to relay the 200 OK response from the HTTP server because e.g. another response was already relayed.

"ACK-Like" Mechanism

In this design alternative:
The 5GC Network Element that acts as an HTTP Client (communication initiator) formulates the request as per current APIs specifications. In addition, in some example embodiments, if the Client supports the ACK-like mechanism, it may indicate its preference to use the ACK-like mechanism in the specific Request by adding a (newly defined) HTTP header in the Request (e.g. 3gpp-Sbi-Ack).

If the Server (communication partner) does not understand the newly defined HTTP header (optional check) or does not support the ACK-like mechanism for the specific request (optional check) it formulates the Response as per current APIs specifications.

If the Server understands the newly defined HTTP header (optional check) and supports the ACK-like mechanism for the specific request (optional check), it prepares the response as per current API specifications. Additionally, it:
- adds a new HTTP header 3gpp-Sbi-Ack including the URI to which the ACK-like message shall be sent and
- starts a "revert" timer.

If the HTTP Client receives Response which does not include the ACK specific HTTP header (optional check) it proceeds with call processing as per current implementation.

If the HTTP Client receives Response and the Response includes the ACK specific HTTP header, or if the HTTP client knows that the ACK-like mechanism is used for the specific request (e.g. due to its configuration):
- If the client successfully processes the Response
  - It sends a HTTP POST (ACK) Request message to the Callback URI previously provided by the Server in the 3gpp-Sbi-Ack header
  - When the Server receives the POST message
    - it Cancels the "revert" timer and
    - responds with a 200 OK that confirms that the acknowledgment was received.
- If the HTTP Client fails to process the Response, or if the Client is an SCP that cannot further relay the response (e.g. has previously relayed a different response from another server for the same request)
  - The Client does not send any message The client shall assume that processing of original Request is reverted on the server side (equivalent as if it had received 4xx/5xx to the original request)

When server Timer expires, the Server attempts to revert the resource to its original state (i.e. state as if the Request was never processed)

If either the Client or the Server does not support the "ACK-like" mechanism the current error handling mechanisms apply.

Figure 9:
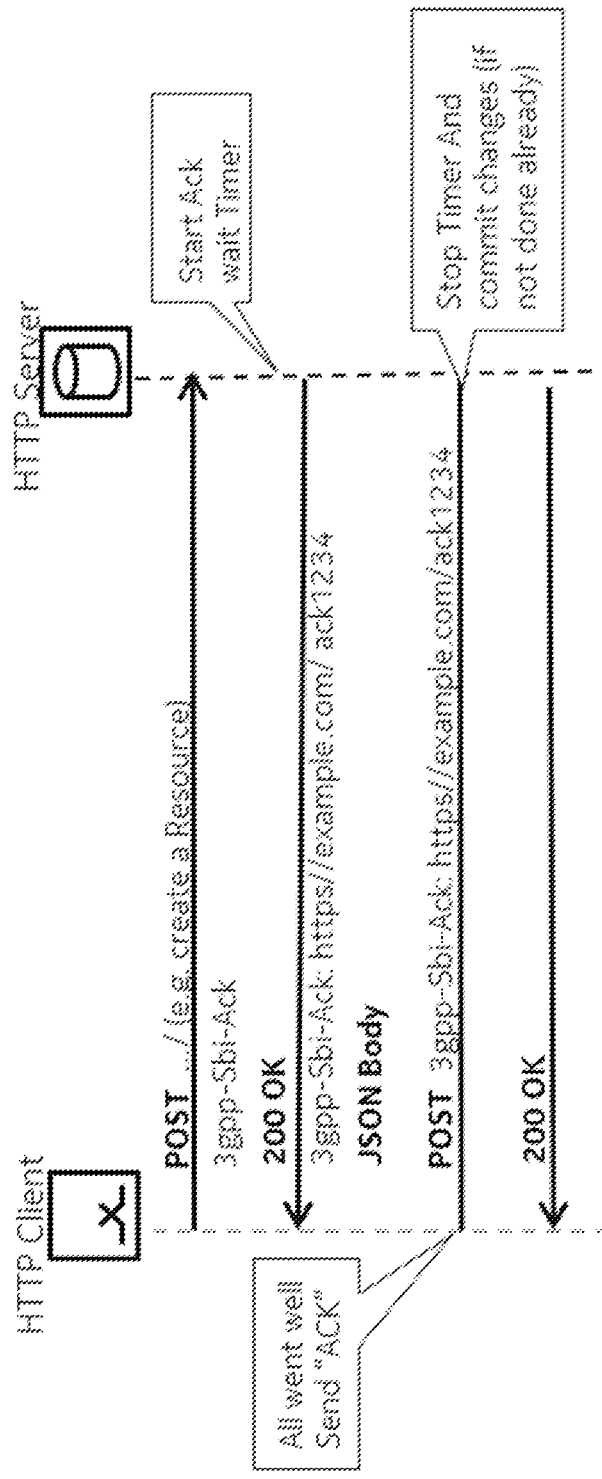
FIG. 9 shows a message flow according to some example embodiments of the invention.
Figure 10:
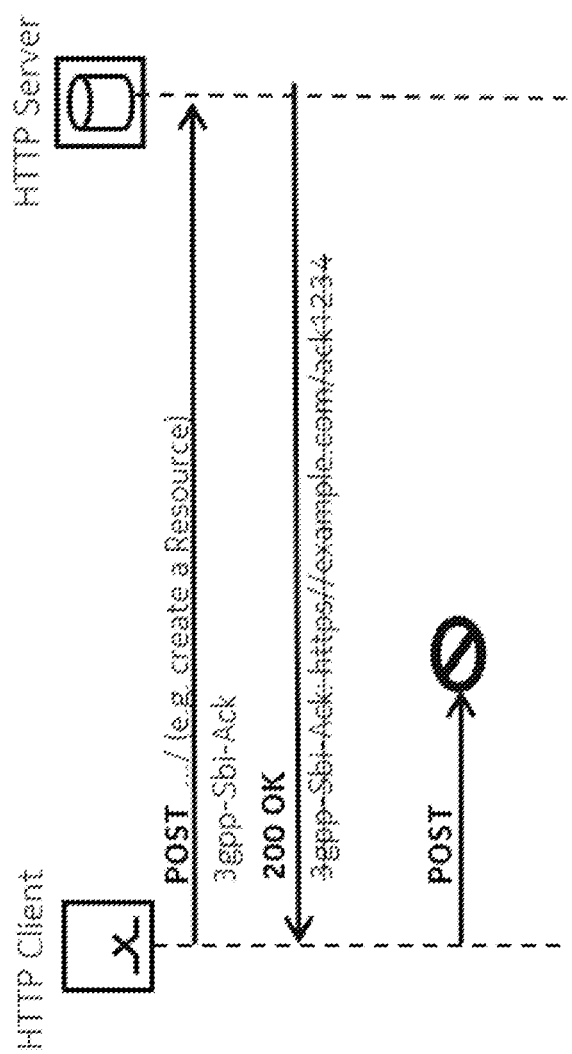
FIG. 10 shows a message flow according to some example embodiments of the invention.
Figure 11:
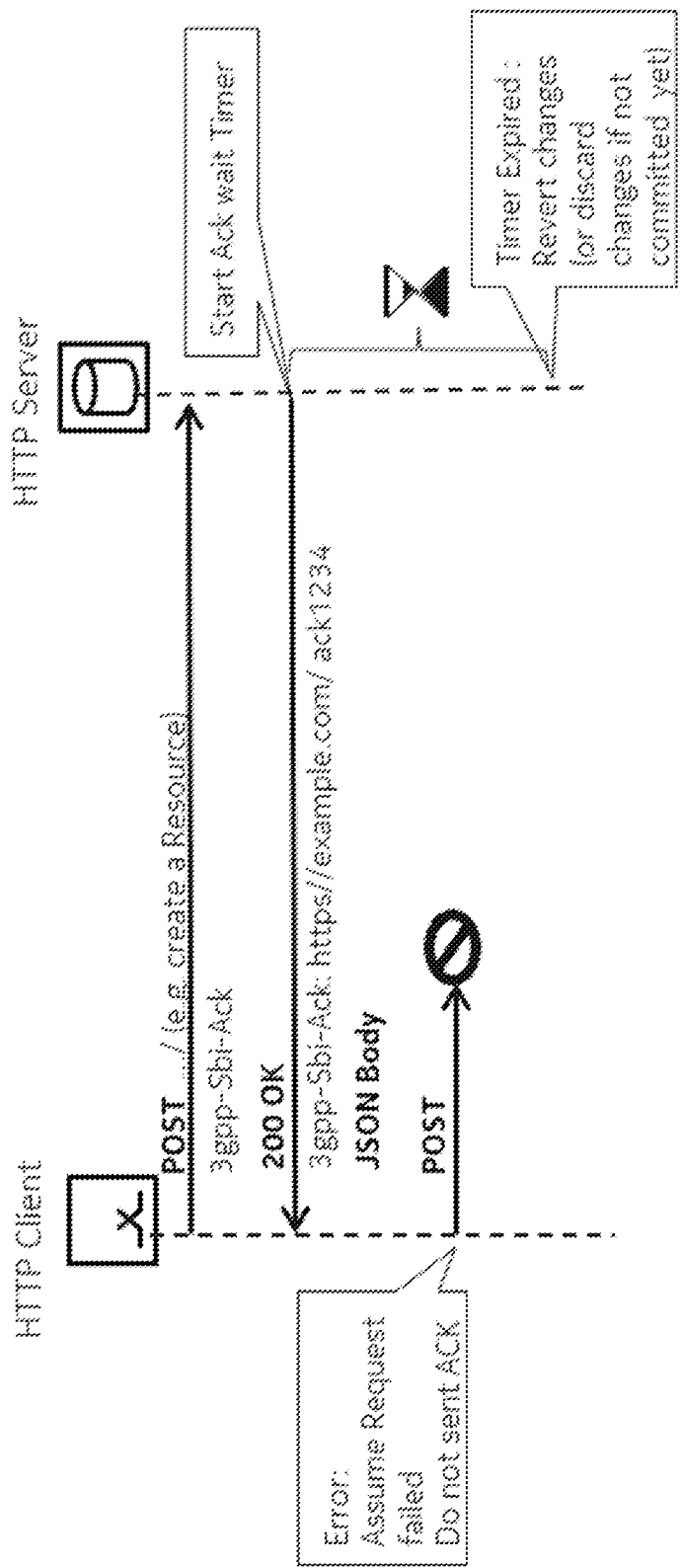
FIG. 11 shows a message flow according to some example embodiments of the invention.

Detailed message flows (in addition to that of FIG. 5) for the different cases according to some example embodiments of the invention with the ACK-like design are shown in FIGS. 9 to 11.

FIG. 9 shows a message flow, wherein the HTTP client (communication initiator) successfully processes the 200 OK response from the HTTP server (communication partner). In this case, the client POSTs an ACK-like to the indicated resource. If the HTP server learns the ACK-like, it stops its timer and commits the changes (if not already done). In FIG. 10, the server does not support the ACK-like mechanism. Thus, the 200 OK response to the initial message does not comprise an indication of a resource. Accordingly, irrespective of whether or not the client successfully processes the 200 OK response from the server, it does not POST ACK-like to any resource.

In FIG. 11, the HTTP client (communication initiator) does not successfully process the 200 OK response from the HTTP server (communication partner) which supports the ACK-like mechanism. Accordingly, the HTTP client does not send (POST) on the location indicated by the HTTP server in the 200 OK response (ACK-like). When the timer on the HTTP server elapses, the HTTP server reverts the successful processing of the initial message (e.g. reverts creating a resource by deleting the resource).

The message flows of FIGS. 5 and 9 to 11 are also applicable in case of an SCP. In this case, the SCP plays the role of the HTTP client. Processing error in the HTTP client may correspond to a processing error in the SCP, or it may correspond to the SCP being unable to relay the 200 OK response from the HTTP server because e.g. another response was already relayed.

Some main advantages of this invention are explained in detail as follows:

Improved network robustness: Can be used to mitigate impact of non-idempotent Requests when HTTP Client fails to process 2xx HTTP Responses or when a SCP cannot relay the response back to the original HTTP client. "ACK-like" mechanism can additionally support mitigation actions in case the 2xx Response was lost (e.g. due to intermediate SCP failure)

Efficiency: Minimum signaling overhead in case the NACK-like mechanism is used

Backwards Compatibility: Can be gradually introduced in network as it backwards compatible with clients/servers that do not support ACK/NACK-like mechanism (will be used only by the ones that support it—ignored otherwise)

Implementation Agility: Server may support ACK/NACK-like mechanism only for certain Requests (e.g. feasibility may depend on type of Request or Support by other NF Producer Peers required to complete the operation)

Consistent KPI status: Supports consistent view of the Success/Failure rates between Client and Servers.

FIG. 12 shows an apparatus according to an example embodiment of the invention. The apparatus may be a communication initiator (e.g. a client or a server such as a HTTP client or HTTP server, or an SCP), or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for monitoring 10, means for supervising 20, and means for providing 30. The means for monitoring 10, means for supervising 20, and means for providing 30 may be a monitoring means, supervising means, and providing means, respectively. The means for monitoring 10, means for supervising 20, and means for providing 30 may be a monitor, supervisor, and provider, respectively. The means for monitoring 10, means for supervising 20, and means for providing 30 may be a monitoring processor, supervising processor, and providing processor, respectively.

The means for monitoring 10 monitors if a communication initiator receives a confirmation in response to an initial message from the communication initiator to a communication partner (S10). The confirmation comprises an identifier of a callback resource. The confirmation confirms that the initial message is successfully processed by the communication partner.

The means for supervising 20 supervises if the communication initiator successfully processes the confirmation (S20).

If the communication initiator receives the confirmation comprising the identifier of the callback resource (S10=yes) and the communication initiator does not successfully process the confirmation (S20=no), the means for providing 30 provides a non-successful information at the callback resource (S30).

FIG. 14 shows an apparatus according to an example embodiment of the invention. The apparatus may be a communication initiator (e.g. a client or a server such as a HTTP client or HTTP server, or an SCP), or an element thereof. FIG. 15 shows a method according to an example embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for monitoring 110, means for supervising 120, and means for providing 130. The means for monitoring 110, means for supervising 120, and means for providing 130 may be a monitoring means, supervising means, and providing means, respectively. The means for monitoring 110, means for supervising 120, and means for providing 130 may be a monitor, supervisor, and provider, respectively. The means for monitoring 110, means for supervising 120, and means for providing 130 may be a monitoring processor, supervising processor, and providing processor, respectively.

The means for monitoring 110 monitors if a communication initiator receives a confirmation in response to an initial message from the communication initiator to a communication partner (S110). The confirmation comprises an identifier of a callback resource. The confirmation confirms that the initial message is successfully processed by the communication partner.

The means for supervising 120 supervises if the communication initiator successfully processes the confirmation (S120).

If the communication initiator receives the confirmation comprising the identifier of the callback resource (S110=yes) and the communication initiator successfully processes the confirmation (S120=yes), the means for providing 30 provides a successful information at the callback resource (S130).

FIG. 16 shows an apparatus according to an example embodiment of the invention. The apparatus may be a communication partner (e.g. a server or a client such as a HTTP server or HTTP client, or an SCP), or an element thereof. FIG. 17 shows a method according to an example embodiment of the invention. The apparatus according to FIG. 16 may perform the method of FIG. 17 but is not limited to this method. The method of FIG. 17 may be performed by the apparatus of FIG. 16 but is not limited to being performed by this apparatus.

The apparatus comprises means for supervising 210, means for instructing 220, means for monitoring 230, and means for ordering 240. The means for supervising 210, means for instructing 220, means for monitoring 230, and means for ordering 240 may be a supervising means, instructing means, monitoring means, and ordering means, respectively. The means for supervising 210, means for instructing 220, means for monitoring 230, and means for ordering 240 may be a supervisor, instructor, monitor, and ordering device, respectively. The means for supervising 210, means for instructing 220, means for monitoring 230, and means for ordering 240 may be a supervising processor, instructing processor, monitoring processor, and ordering processor, respectively.

The means for supervising 210 supervises whether a communication partner processes successfully an initial message (S210). The communication partner receives the initial message from a communication initiator.

If the communication partner successfully processes the initial message (S210=yes), the means for instructing 220 instructs the communication partner to provide a confirmation in response to the initial message (S220). The confirmation comprises an identifier of a callback resource.

After the providing of the confirmation (S220), the means for monitoring 230 monitors whether a non-successful information is provided at the callback resource (S230). The unsuccessful information informs that the communication initiator does not process successfully the confirmation.

If the non-successful information is provided at the callback resource after the providing of the confirmation (S230=yes), the means for ordering 240 orders the communication partner to revert the successful processing of the initial message which was performed by the communication partner (S240).

Figure 19:
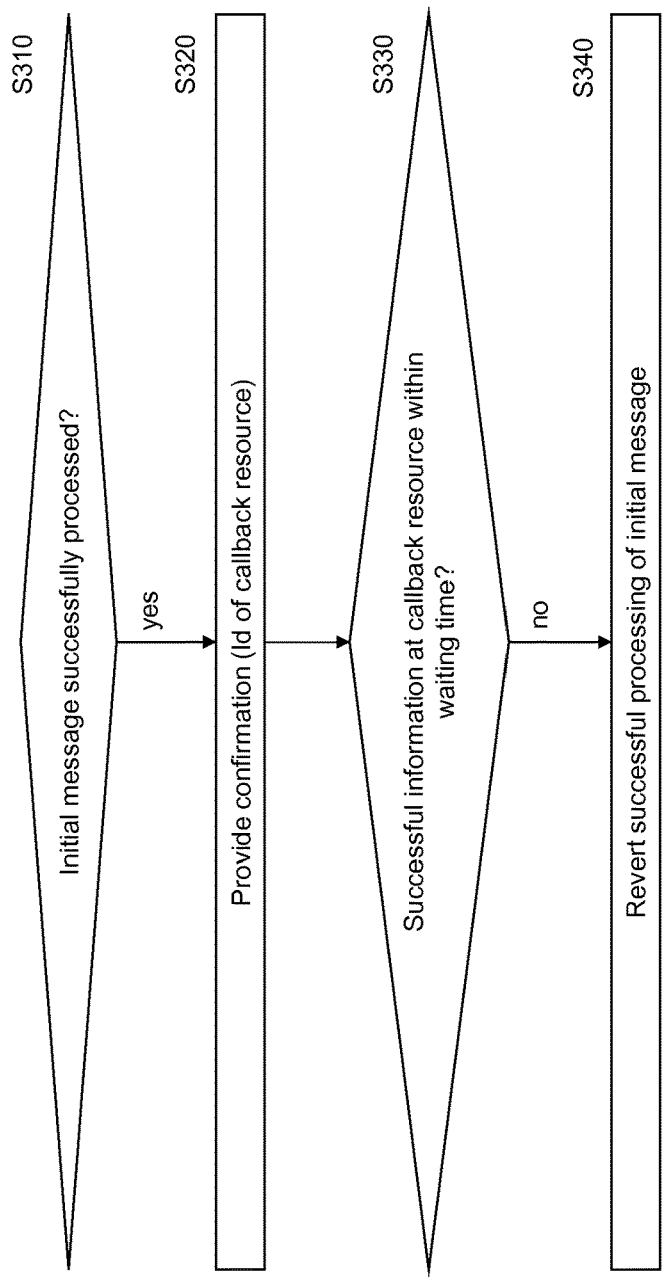
FIG. 19 shows a method according to an example embodiment of the invention.
Figure 18:
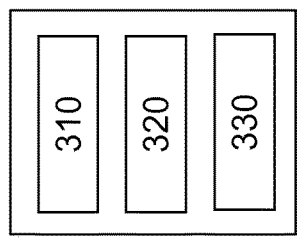
FIG. 18 shows an apparatus according to an example embodiment of the invention.

FIG. 18 shows an apparatus according to an example embodiment of the invention. The apparatus may be a communication partner (e.g. a server or a client such as a HTTP server or HTTP client, or an SCP), or an element thereof. FIG. 19 shows a method according to an example embodiment of the invention. The apparatus according to FIG. 18 may perform the method of FIG. 19 but is not limited to this method. The method of FIG. 19 may be performed by the apparatus of FIG. 18 but is not limited to being performed by this apparatus.

The apparatus comprises means for supervising 310, means for instructing 320, means for monitoring 330, and means for ordering 340. The means for supervising 310, means for instructing 320, means for monitoring 330, and means for ordering 340 may be a supervising means, instructing means, monitoring means, and ordering means, respectively. The means for supervising 310, means for instructing 320, means for monitoring 330, and means for ordering 340 may be a supervisor, instructor, monitor, and ordering device, respectively. The means for supervising 310, means for instructing 320, means for monitoring 330, and means for ordering 340 may be a supervising processor, instructing processor, monitoring processor, and ordering processor, respectively.

The means for supervising 310 supervises whether a communication partner processes successfully an initial message (S310). The communication partner receives the initial message from a communication initiator.

If the communication partner successfully processes the initial message (S310=yes), the means for instructing 320 instructs the communication partner to provide a confirmation in response to the initial message (S320). The confirmation comprises an identifier of a callback resource.

After the providing of the confirmation (S320), the means for monitoring 330 monitors whether a successful information is provided at the callback resource (S330) within a predefined waiting time after the providing of the confirmation.

If the successful information is not provided at the callback resource within the predefined waiting time after the providing of the confirmation (S330=no), the means for ordering 340 orders the communication partner to revert the successful processing of the initial message which was performed by the communication partner (S340).

Figure 20:
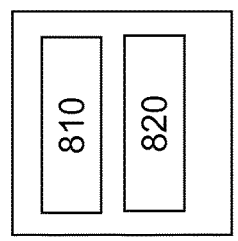
FIG. 20 shows an apparatus according to an example embodiment of the invention.

FIG. 20 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 13, 15, 17, and 19 and related description.

Some example embodiments are explained with respect to a 5G network. However, the invention is not limited to 5G. It may be used in 3G or 4G networks and 3GPP networks of future generations. It is not even limited to 3GPP networks. It may be used in other wireless or wired access networks (e.g. WiFi networks) and corresponding core networks.

Some example embodiments of the invention are described with reference to HTTP. However, the invention is not limited to HTTP. For example, it may be applied to HTTPS. It may be applied to other protocols where a communication between a communication initiator and a communication partner is foreseen.

While in 5GC APIs the HTTP client is commonly the Service Consumer and the HTTP server is the Service Producer. Accordingly, the communication is initiated by the HTTP client. However, some example embodiments of the invention may be used correspondingly for notification messages where the HTTP client/server roles are reversed (i.e. NF service producer acts as an HTTP client and NF service consumer acts as an HTTP server). I.e., the communication is initiated by the server. Thus, the communication initiator may be the service consumer or the service producer, and the communication partner may be the service producer or the service consumer, respectively.

Some embodiments of the invention may be also used by entities (in particular: 5G Core network entities) that process HTTP messages but are not Network Functions, such as Service Communication Proxies (SCPs). A SCP may even play both roles of a communication initiator and a communication partner for a same communication: communication partner towards the original communication initiator, and communication initiator towards the actual target of the communication (communication partner).

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a communication initiator, e.g. a client or a communication proxy, in particular a HTTP client or a SCP, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a communication partner, e.g. a server or a communication proxy, in particular a HTTP server or a SCP, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus comprising:
one or more processors, and
memory storing instructions that, when executed by the one or more processors, cause the apparatus to:
monitor if a communication initiator receives a confirmation in response to an initial message from the communication initiator to a communication partner, wherein the initial message is a notification;
supervise if the communication initiator successfully processes the confirmation;
provide a non-successful information at a callback resource if the confirmation comprises the identifier of the callback resource and the communication initiator does not successfully process the confirmation; wherein
   the confirmation comprises an identifier of the callback resource; and
   the confirmation confirms that the initial message is successfully processed by the communication partner;
check if an acknowledgment to the non-successful information provided at the callback resource is received;
operate according to a status information if the acknowledgment is received, wherein
the acknowledgment comprises the status information, and
the status information informs about a status of inverting the processing of the initial message; and
inhibit the providing the non-successful information at the callback resource if the communication initiator successfully processes the confirmation,
   wherein the confirmation contains a hypertext transfer protocol header including a hypertext transfer protocol uniform resource identifier of the callback resource,
   wherein the communication initiator is configured to act as a service consumer, and the communication partner is configured to act as a service producer or as a communication proxy,
if the communication partner is configured to act as the communication proxy, the initial message requests to create a resource in a further server of the hypertext transfer protocol,
wherein the communication initiator does not successfully process the confirmation if the following conditions are fulfilled:
a format of the confirmation is incorrect such that the communication initiator does not understand the confirmation;
   the communication initiator receives the confirmation after a predetermined time has elapsed after the communication initiator sent the initial message; and
the communication initiator acts as a communication proxy relaying the communication between an original communication initiator and the communication partner, and the communication proxy cannot or must not forward the confirmation to the original communication initiator,
wherein if the communication partner is configured to act as the service producer, the initial message requests to create a resource in the server of the hypertext transfer protocol, and
wherein the non-successful information provided at a callback resource includes the response to the initial message.

* * * * *